Patented June 28, 1932

1,864,858

UNITED STATES PATENT OFFICE

WALTER H. RISING, OF PAINTED POST, NEW YORK, ASSIGNOR TO CORNING GLASS WORKS, OF CORNING, NEW YORK, A CORPORATION OF NEW YORK

CADMIUM CONTAINING GLASS AND TUBING MADE THEREFROM

No Drawing.    Application filed March 15, 1930.   Serial No. 436,257.

By means of the invention here disclosed I am enabled to produce yellow glasses colored with cadmium sulfide and zinc sulfide having valuable light-absorbing and transmitting properties but free from the objectionable opalescence which occurs when such glasses of the prior art are reheated or slowly cooled as for example in the tube-drawing operation, and I am also enabled to produce, as a new article of manufacture, a tubing of yellow low expansion glass having a sharp spectral cut-off in the neighborhood of 5000 A. U. and suitable for use in neon sign-lights.

Furthermore by this invention I am enabled to produce glasses colored with cadmium sulfide and selenium which are ruby or orange in color and have all the valuable light-absorbing and transmitting properties of the well known selenium ruby and selenium orange glasses but which are free from any opacity or opalescence due to sulfides and this regardless of the amount or duration of reheating or slow cooling. Thus I have produced, as a new article of manufacture, a transparent ruby tubing of solid color having the sharp spectral cut-off which is characteristic of selenium ruby glasses and located in any desired region of the red end of the spectrum, such glasses being free from opacity or opalescence.

The invention herein described is applicable not only to soft glasses but also to the so-called heat-resisting or low expansion borosilicate glasses.

The difficulty met in developing glasses of the above characteristics will be understood when the following is considered:

1. In order to produce a glass of sufficiently low expansion to permit sealing with glass $B_1$ of the Sullivan and Taylor Patent No. 1,304,623, it is necessary to employ boric oxide.

2. Cadmium sulfide together with zinc sulfide is the only coloring agent which will devlop the desired sharp spectral cut-off.

3. Known borosilicates containing zinc become opal when cadmium sulfide or zinc sulfide is added. This opalescence is caused by precipitation or growth of colloidal particles of zinc sulfide and, when any sulfide is added to a zinc-containing glass zinc sulfide is formed.

4. Known borosilicates free from zinc become opal when zinc sulfide is added but remain transparent when cadmium sulfide alone is used. Cadmium sulfide is relatively soluble in glass but zinc sulfide is only slightly soluble.

5. Known borosilicates free from zinc do not develop a sharp spectral cut-off when colored with cadmium sulfide alone, that is, the presence of zinc sulfide with the cadmium sulfide is necessary in order to produce a sharp spectral cut-off.

6. Soft glasses, that is to say, glasses which are substantially free from boric oxide, are subject to the same considerations as outlined in statements 3, 4 and 5 except that opalization is not as severe in such glasses as it is in the case of borosilicates. Zinc sulfide is more soluble in soft glasses than in borosilicates and on this account a larger amount of zinc sulfide may be present without causing precipitation.

In the case of glasses colored with cadmium sulfide and selenium, that is to say, selenium ruby glasses, opacity or opalescence may occur by formation and precipitation of excess zinc sulfide in the same manner as in yellow glasses colored with cadmium sulfide and zinc sulfide.

I have discovered that the opacity or opalescence described above as occurring in yellow glasses and in ruby glasses may be prevented by addition of cadmium oxide as will be more fully explained below. Thus it becomes possible to produce transparent tubing of selenium ruby glass as well as yellow glass having a sharp spectral cut-off, an accomplishment which has heretofore been impossible owing to the fact that ordinary selenium ruby glass and the yellow glass above referred to become opaque when subjected to repeated heating and cooling as in the tube-drawing operation.

I am aware of the patent to Huber and Felton, No. 1,673,679, in which are described lead glazes colored with cadmium sulfide or with cadmium sulfide and selenium and in which cadmium oxide is used for the purpose of preventing the formation of discoloring lead compounds. However, it is known that lead glasses, as distinguished from lead glazes, cannot be colored with cadmium sulfide or with cadmium sulfide and selenium because these coloring agents are rapidly volatilized from lead glasses during melting leaving the final product substantially free from color. Consequently zinc containing glasses are customarily used when it is desired to produce glasses colored with these coloring agents.

In the melting of glasses which contain volatile constituents such as cadmium sulfide, selenium or zinc sulfide, the results obtained with a stated batch will vary, depending on the length of time melted and the temperature employed. For the same reason batches melted in open crucibles will not give the same result as the same batches melted in closed pots. Therefore, it will readily be understood that examples of my glasses, which, under all conditions of melting, will have the desired transmitting and absorbing properties, and at the same time be free from opalescence, cannot be stated.

The following are glasses I have melted successfully in closed pots expressed in terms of percentage compositions as calculated from their respective batches:

|  | A | B | C | D |
|---|---|---|---|---|
| $SiO_2$ | 69.5 | 65.7 | 72.7 | 68.6 |
| $Na_2O$ | 5.4 | 5.0 | 15.7 | 16.7 |
| $B_2O_3$ | 15.7 | 11.9 |  |  |
| $ZnO$ | 3.9 | 11.9 | 6.9 | 9.8 |
| $CdO$ | 2.0 | 2.0 | 2.0 | 2.0 |
| $Al_2O_3$ | 1.5 | 1.0 | 1.0 | 1.0 |
| $CdS$ | 1.5 | 2.0 | 1.5 | 1.5 |
| $ZnS$ | .5 |  |  |  |
| $Se$ |  | .5 | .25 | .375 |

These glasses were made into tubing with the following results:

Glass A is bright yellow in color with a spectral cut-off near 5000 A. U. and has a trace of opalescence. This opalescence may be entirely removed if so desired by slightly decreasing the sulfide or increasing the cadmium oxide content. The expansion of this glass is .0000039.

Glass B is deep ruby in color and shows no trace of opalescence due to sulfides. The expansion of this glass is .0000042.

Glasses C and D are light ruby and dark ruby respectively and have a high transmission for the red with no trace of opalescence. These are soft glasses of rather high expansion. Since ruby glasses have the peculiar property of coloring-in when reheated, these two glasses would require a higher selenium content if made into other kinds of ware.

The tube drawing operation is the most severe test of the effectiveness of this invention and offers the most favorable condition for the development of opacity, or opalscence, due to excess zinc sulfide. The above four glasses when made into tubing would be a dense opal were the cadmium oxide to be omitted.

It will be noted that all of the above glasses in addition to containing cadmium sulfide also contain cadmium oxide.

In considering the above glasses the following is noted:

1. Each of them contains cadmium sulfide which tends to cause formation of zinc sulfide in glasses containing zinc, the precipitation of which in turn makes the glass opal. Each of them, however, contains cadmium oxide.

2. All of the above glasses contain zinc oxide which tends to cause conversion of cadmium sulfide to zinc sulfide and cadmium oxide. Inasmuch as the cadmium sulfide is the coloring agent such conversion would tend to remove the color from the glass.

3. Glass A contains zinc sulfide which tends to cause conversion of the cadmium oxide to cadmium sulfide, which is an active coloring agent, but too much zinc sulfide leaves an excess of the latter and causes opalization.

4. Each of the glasses contains cadmium oxide which tends to cause conversion of the zinc sulfide to zinc oxide and cadmium sulfide, and hence removes the danger of formation and precipitation of excess zinc sulfide. It is believed that the action of the cadmium oxide in preventing the formation of zinc sulfide by the reaction of the cadmium sulfide with the zinc oxide, is an example of the law of chemical mass action in that the addition of the quantities of cadmium oxide above named causes a reversal of the reaction and prevents the formation of the zinc sulfide.

If one introduces into the above described glasses containing cadmium oxide and cadmium sulfide, lead oxide in amounts exceeding approximately 2% the color and sharp spectral cut-off of said glasses are destroyed unless a substantial amount of zinc sulfide be present in the batch. Lead glasses which are free from zinc will not hold the color of cadmium sulfide nor selenium because both cadmium sulfide and selenium are rapidly burned out of such glasses during melting leaving the final product substantially free from color and such glasses therefore do not possess a sharp spectral cut-off. However lead glasses which contain zinc oxide and cadmium oxide and which are colored with cadmium sulfide or with cadmium sulfide and selenium possess both color and a sharp spectral cut-off provided zinc sulfide be added to the batch or provided in the absence of zinc sulfide the lead oxide content does not exceed approximately 2%. In zinc-lead glasses, cadmium oxide prevents opalescence caused by the precipitation of zinc sulfide in the manner described above for zinc glasses.

The following percentage compositions are given as examples of lead containing glasses falling within my invention which I have melted in accordance with these principles as calculated from their respective batches.

|   | E | F | G | H | I | J | K |
|---|---|---|---|---|---|---|---|
| $SiO_2$ | 71 | 64 | 65 | 61 | 69 | 66 | 67 |
| $Na_2O$ | 18 | 18 | 18 | 18 | 5 | 5 | 5 |
| $B_2O_3$ |   |   |   |   | 15 | 15 | 15 |
| PbO | 2 | 8 | 2 | 5 | 2 | 6 | 2 |
| ZnO | 5 | 5 | 10 | 10 | 2 | 2 | 5 |
| $Al_2O_3$ |   |   |   |   | 1 | 1 |   |
| CdO | 1 | 2 | 2 | 2 | 2 | 2 | 2 |
| CdS | 3 | 2 | 2 | 2 | 2 | 4 | 2 |
| ZnS |   |   | 1 |   |   | 1 |   |
| Se |   |   |   | 1 | 1 |   | 1 |

These glasses were melted in open crucibles and on account of the volatility of cadmium sulfide, zinc sulfide and selenium, these glasses would require somewhat less of these constituents to produce the same colors if melted in closed pots.

Glasses E, F, I and J are yellow in color with a sharp spectral cut-off in the neighborhood of 5000 A. U. and are substantially free from opalescence, I and J being borosilicates.

Glasses G, H and K are deep red in color with a sharp spectral cut-off and are substantially free from opalescence, K being a borosilicate.

It will be noted that these glasses all contain lead oxide together with zinc oxide and also cadmium oxide. If the zinc oxide were omitted from these glasses they would be substantially free from color and would possess no sharp spectral cut-off. Furthermore, if the cadmium oxide were omitted from these glasses, they would be more or less opalescent when subjected to slow cooling or reheating, as in the tube drawing operation.

This application is a continuation in part of my previous application, Serial Number 308,146, filed September 24, 1928, in which I have described zinc glasses colored with cadmium sulfide and with cadmium sulfide and selenium and also containing sufficient cadmium oxide to prevent substantial opalescence.

Having thus described my invention what I claim as new and desire to secure by United States Letters Patent is:

1. A glass containing zinc colored by the addition of cadmium sulfide and also containing sufficient cadmium oxid to prevent substantial opalescence.

2. A zinc borosilicate glass containing cadmium sulfide and also containing sufficient cadmium oxid to prevent substantial opalescence due to precipitation of zinc sulfide.

3. A glass containing zinc colored by cadmium sulfide and selenium and also containing sufficient cadmium oxid to prevent substantial opalescence.

4. A zinc borosilicate glass containing cadmium sulfide and also containing sufficient cadmium oxid to prevent substantial opalescence due to precipitation of zinc sulfide, and also containing selenium.

5. A tube made of a transparent yellow glass having a sharp spectral cut-off in the neighborhood of 5000 A. U., the glass being a zinc borosilicate colored by cadmium sulfide and also containing sufficient cadmium oxid to prevent the development of substantial opalescence during fabrication into tubing.

6. A tube made of transparent ruby glass, the glass containing zinc and being colored by cadmium sulfide and selenium and also containing sufficient cadmium oxid to prevent the development of substantial opalescence during fabrication into tubing.

7. A glass containing zinc oxide and not over 2% of lead oxide and colored by the addition of cadmium sulfide and also containing sufficient cadmium oxide to prevent substantial opalescence.

8. A glass containing lead oxide and zinc oxide, colored by the addition of cadmium sulfide and also containing zinc sulfide and sufficient cadmium oxide to prevent substantial opalescence.

9. A glass containing zinc oxide and not more than approximately 2% of lead oxide and colored by the addition of cadmium sulfide and selenium and also containing sufficient cadmium oxide to prevent substantial opalescence.

10. A glass containing lead oxide and zinc oxide colored by the addition of cadmium sulfide and selenium and also containing zinc sulfide and sufficient cadmium oxide to prevent substantial opalescence.

11. The method of preventing opalescence in a glass containing zinc and not over 2% of lead as oxide and colored by the addition of cadmium sulfide, which comprises adding cadmium oxide to the batch.

12. The method of preventing opalescence in a glass containing zinc and not over 2% of lead as oxide and colored by the addition of cadmium sulfide and selenium which comprises adding cadmium oxide to the batch 13. A tube made of a transparent yellow glass having a sharp spectral cut-off in the neighborhood of 5000 A. U., the glass containing zinc and not over 2% of lead as oxide and being colored by cadmium sulfide and also containing sufficient cadmium oxide to prevent the development of substantial opalescence during fabrication into tubing.

14. A tube made of transparent ruby glass, the glass containing zinc and not over 2% of lead as oxide and being colored by cadmium sulfide and selenium and also containing sufficient cadmium oxide to prevent the development of substantial opalescence during fabrication into tubing.

15. A batch for a glass containing zinc and colored with cadmium sulfide characterized in that said batch contains sufficient cadmium oxide to prevent substantial opalescence in the finished glass due to precipitated zinc sulfide.

16. A batch for a glass containing zinc and colored with cadmium sulfide and selenium characterized in that said batch contains sufficient cadmium oxide to prevent substantial opalescence in the finished glass due to precipitated zinc sulfide.

17. A batch for a glass containing zinc and colored with cadmium sulfide characterized in that said batch contains in addition to the coloring agent from 0.5% to 2% of cadmium oxide.

18. A batch for a glass containing zinc and colored with cadmium sulfide and selenium characterized in that said batch contains in addition to the coloring agent from 0.5% to 2% of cadmium oxide.

19. The method of preventing opalescence due to precipitation of zinc sulfide in a zinc containing glass colored with cadmium sulfide which includes adding cadmium oxide to the batch.

20. The method of preventing opalescence due to precipitation of zinc sulfide in a zinc containing glass colored with cadmium sulfide and selenium which includes adding cadmium oxide to the batch.

21. The method of preventing opalescence due to precipitation of zinc sulfide in a zinc containing glass colored with cadmium sulfide which includes adding to the batch from 0.5% to 2% of cadmium oxide in addition to the coloring agent.

22. A method of making yellow glass tubing substantially free from opalescence due to precipitated zinc sulfide which includes preparing a batch for a zinc containing glass, adding to the batch sufficient cadmium sulfide for coloring purposes and from 0.5% to 2% of cadmium oxide, melting the batch and forming the molten glass into tubing.

23. The method of making ruby glass tubing substantially free from opalescence due to precipitated zinc sulfide which includes preparing a batch for a zinc containing glass, adding to the batch sufficient cadmium sulfide and selenium for coloring purposes and from 0.5% to 2% of cadmium oxide, melting the batch and forming the molten glass into tubing.

WALTER H. RISING.